United States Patent [19]

Behrens

[11] 4,116,855

[45] Sep. 26, 1978

[54] STABILIZED ACCELERATOR COMPOSITION FOR RUBBER

[75] Inventor: Rudolf Adolf Behrens, Gladstone, N.J.

[73] Assignee: American Cyanamid Company, Stamford, Conn.

[21] Appl. No.: 779,113

[22] Filed: Mar. 18, 1977

[51] Int. Cl.$^2$ ............................ C08K 5/43; C08K 5/35
[52] U.S. Cl. ..................................... 252/182; 252/403; 260/45.8 SN; 260/779 R; 260/791; 260/793; 526/35; 526/50; 526/49; 526/56
[58] Field of Search ............................... 252/182, 403; 260/45.8 SN, 79.5 C, 779 R, 791, 793

[56] References Cited

U.S. PATENT DOCUMENTS

| 3,382,218 | 5/1968 | Ayad | 260/791 |
|---|---|---|---|
| 3,413,273 | 11/1968 | Alicot et al. | 260/793 |
| 3,417,086 | 12/1968 | Smith et al. | 260/793 |
| 3,919,179 | 11/1975 | Maxey | 260/793 |
| 4,062,797 | 12/1977 | Behrens | 252/182 |

*Primary Examiner*—Benjamin R. Padgett
*Assistant Examiner*—Irwin Gluck
*Attorney, Agent, or Firm*—Frank M. Van Riet

[57] ABSTRACT

N,N'-[(thiocarbonyl)thio]dimorpholine is stabilized, as an acceleration for rubber, by incorporating therein various unsaturated amides or esters.

5 Claims, No Drawings

STABILIZED ACCELERATOR COMPOSITION FOR RUBBER

This invention relates to stabilized accelerator compositions for rubber. More particularly, the invention relates to an accelerator composition comprising N,N'-[(thiocarbonyl)thio]dimorpholine (I):

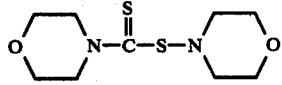

(I)

and an effective stabilizing amount of an acrylic amide or ester.

In my copending application, Ser. No. 690,128, filed May 26, 1976, I disclosed the stabilization of mixtures of primary rubber accelerators, i.e. benzothiazole sulfenamides and thiuram sulfides, both of which are commonly used in the vulcanization of rubber, but which tend to deteriorate on aging when combined. In general, both the benzothiazole sulfenamides and the thiuram sulfides are stable for long periods of time uncombined; i.e., they both possess good shelf life or storage stability.

N,N'[(thiocarbonyl)thio]dimorpholine is one of a class of primary accelerators, disclosed in my aforementioned copending application, which is stabilized in mixtures with thiuram sulfides. It is an accelerator having good scorch protection and provides a fast rate of cure, and is, therefore, an important rubber accelerator. Unfortunately, the compound is not stable on storage alone at ambient temperatures, as evidenced by its loss of accelerator activity with time. In fact, I have found that at temperatures of 110°-115° F., commonly encountered in warehouses during the warm months, the compound suffers considerable loss of activity in a relatively short time.

It is, therefore, a primary object of this invention to provide means for stabilizing N,N'-[(thiocarbonyl)-thio]dimorpholine against deterioration during storage.

N,N'[(thiocarbonyl)thio]dimorpholine is an old compound. It can be readily made by reacting sodium 4-morpholinocarbodithioate (II) with N-chloromorpholine (III):

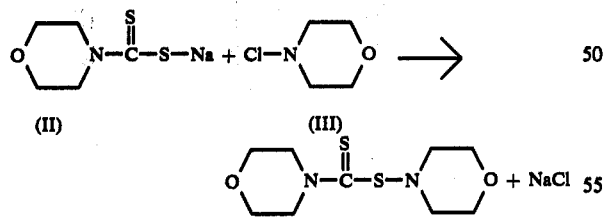

Another method is described by Smith et al., U.S. Pat. No. 3,417,086 whereby (II) is reacted with morpholine and an oxidizing agent such as an aqueous solution of iodine and potassium iodide or sodium hypochlorite or other oxidizing agent known in the art for the preparation of thiocarbonyl-sulfides.

Use of the compound as an accelerator is described by Taylor, Rubber Chem. & Tech. 47 (No. 4), 906-910 (1974).

The acrylic esters and amides which are useful in stabilizing N,N'[(thiocarbonyl)thio]dimorpholine according to the instant invention include (a) amides represented by Formula (IV):

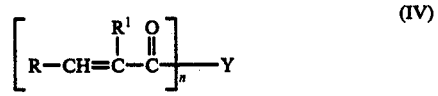

(IV)

wherein R and $R^1$ are hydrogen or methyl, $n$ is an integer from 1 to 3, inclusive, and Y represents

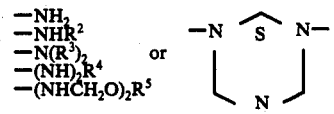

wherein $R^2$ and $R^3$ are, individually, alkyl, alkoxyalkyl or hydroxymethyl and $R^4$ and $R^5$ are, individually, alkylene, oxydialkylene or arylene, and (b) esters represented by Formula (V):

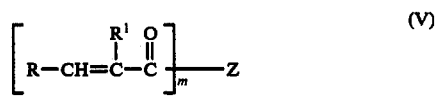

(V)

wherein R and $R^1$ are hydrogen or methyl and $m$ is an integer from 1 to 4, inclusive, provided that when $m$ is 1, Z is $-OR^6$ wherein $R^6$ is alkyl or alkoxyalkyl; when $m$ is 2, Z is $-OR^7O-$ wherein $R^7$ is alkylene or oxydialkylene; when $m$ is 3,

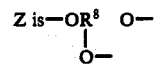

wherein $R^8$ is alkylene; and when $m$ is 4, Z is the group:

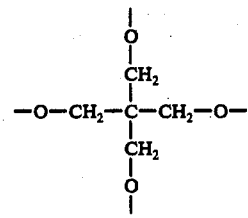

Compounds representative of the esters of Formula (V) include mono-, bis-, tris- and tetraesters of acrylic acid and methacrylic acid, such as octylacrylate, nonylacrylate, butylmethacrylate, 1,4-butyleneglycol diacrylate, trimethylolpropane triacrylate, diethyleneglycol diacrylate, diethyleneglycol dimethacrylate, pentaerythritol tetracrylate, methoxymethylacrylate, methoxyethyl methacrylate, methoxyethyl acrylate and the like.

Compounds representative of amides of Formula (IV) include acrylamide, methacrylamide, their N mono- and dialkyl-substituted derivatives; N-alkoxyalkylacrylamides and methacrylamides; N-hydroxymethylacrylamide and methacrylamide; alkylenebis-, arylenebis-, and oxydialkylenebisacrylamides and methacrylamides. Specific compounds include N-isopropylacrylamide, N-tert. butylacrylamide, N-tert. octyl acrylamide, N-tert. butylmethacrylamide, N,N-dibutyla crylamide, N,N-dioctylacrylamide, N,N-dibutylmethacrylamide, N-isobutoxymethylacrylamide, N,N'-methylenebisacrylamide, N,N'-phenylenebisacrylamide, N,N'-methylenebismethacrylamide, N,N'-hexamethylenebisacrylamide, N,N'-oxydimethylenebisacrylamide, 1,3,5-triacrylylhexahydro-s-triazine, and the like.

In practicing the invention, N,N-[(thiocarbonyl)thio]dimorpholine is blended in any convenient manner consistent with the invention with a stabilizer compound or mixture of such compounds. Since N,N-[(thiocarbonyl)thio]dimorpholine is not very stable, the procedure used to blend it with the stabilizer should avoid exposure to elevated temperatures for too long a period of time. Nevertheless, one method of producing the blend is to melt the N,N-[(thiocarbonyl)thio] dimorpholine, blend in the appropriate stabilizer compound, allow the molten blend to cool and either flake or grind the resultant solid for use. Alternatively, the two compounds may be dry blended. The blending method is not critical to the invention; however, it will be understood that not all stabilizer compounds will melt or dissolve into the molten accelerator and dispersions may sometimes result, and that, in some instances, it may be better to dry blend and vice versa.

The blends may be prepared in any weight ratio without incident, but the stabilizer(s) concentration may range from about 0.25 percent, by weight, to as high as 50 weight percent, depending on the particular stabilizer, it being realized that the stabilizers may vary in their effectiveness in stabilizing the accelerator compound. Ordinarily, the accelerator may be effectively stabilized against deterioration on aging using about 1 to 5 percent of the stabilizer compound, based on the weight of the dimorpholine.

Stabilization, as defined for the purposes of this invention, means any significant improvement in the stability of the N,N'[(thiocarbonyl)thio]dimorpholine after storing for a period of time at normal room temperatures or at an elevated temperature. An accelerated aging test which exemplifies the stabilization is defined hereinbelow. Improvement in stability means any significant reduction of the loss of cure rate experienced by use of the unstabilized compound during a similar period of storage under the same conditions, and/or any significant decrease in the loss of scorch protection (scorch time) relative to the unstabilized compound. The unstabilized compound ordinarily suffers degradation on storage over a period of time such that its use in a vulcanization results in a slower rate of cure and oftentimes a reduction in scorch time. This is often manifested in the vulcanized rubber product by slower development of optimum modulus properties and in many cases the extent of the full cure may be affected, i.e., the optimum properties may not be attained.

Cure rate is determined by use of a Monsanto Oscillating Disc Rheometer and is reported as the maximum slope of the cure curve in inch-pounds per 0.5 minute operating against an oscillating disc embedded in the rubber stock undergoing vulcanization.

Mooney Scorch Time is the elapsed time from the onset of the heating cycle to the start of vulcanization (induction period). With reference to the cure curve traced by the Mooney Viscometer, scorch is reported as $t_5$, which is the time, in minutes, from one minute after the start of heating, for a five point rise in the cure curve above the minimum in the curve, at the temperature of the test, which is usually chosen to represent maximum processing temperature of the unvulcanized rubber composition.

The stabilized N,N-[(thiocarbonyl)thio]dimorpholine is evaluated, as discussed above, in terms of the improvement over an unstabilized sample thereof after a period of aging. It is difficult to determine what constitutes normal storage conditions, in terms of the physical form of storage (drums, fiber packs, paper bags, etc.), the length of storage in days, weeks or months, or the temperature of storage (airconditioned warehouses or exposure to ambient temperature in the warmer climates). In order to evaluate the effectiveness of the stabilizers by a reasonable set of conditions, unless otherwise stated, the stabilized and unstabilized compounds were stored in closed containers for (a) two weeks at normal room temperature (25°–30° C.), (b) for one month at 45° C., and (c) two months at 45° C. The compounds were then evaluated in a standard rubber formulation as described in the following illustrative examples.

In the examples which follow, the compounds were evaluated for effectiveness of the stabilizer using the rubber masterbatch shown below (which contains 100 parts by weight of rubber stock):

| Masterbatch | |
|---|---|
| Styrene-butadiene rubber (oil-extended) | 89.5 |
| Cis- 4 Polybutadiene | 35.0 |
| Philbrick #5 aromatic oil | 25.5 |
| Carbon black | 75.0 |
| Zinc oxide | 5.0 |
| Stearic acid | 1.5 |
| N-Phenyl-N'-(1,3-dimethylbutyl)-p-phenylenediamine | 1.0 |
| Sulfur | 1.75 |

EXAMPLE 1

To four samples, comprising 100 parts of N,N-[(thiocarbonyl)thio]dimorpholine, are added 4.7 parts of (A) oxydimethylenebisacrylamide, (B) 1,3-butyleneglycol diacrylate, (C) pentaerythritol tetraacrylate and (D) 1,3,5-triacrylylhexahydro-s-triazine, respectively.

Each of the four stabilized samples are then (1) added fresh to the above masterbatch i.e. 2 weeks at R.T., (2) added to the above masterbatch after storage for 1 month and (3) added to the above masterbatch after storage for 2 months, at a concentration of 1.0 part of stabilized sample to 100 parts of masterbatch, as described above, with compounding.

Each sample is then subjected to testing in order to ascertain the accelerator activity in promoting the vulcanization reaction as measured by the cure rate. A sample containing no stabilizer is set forth for comparative purposes.

TABLE 1

| | Compositions | | | | |
|---|---|---|---|---|---|
| | None | A | B | C | D |
| Maximum Cure Rate | Oscillating Disc Rheometer at 316° F | | | | |
| (in.-lbs./0.5 min.) | | | | | |
| Fresh | 4.6 | 4.6 | 4.6 | 4.6 | 4.6 |
| 1 month | 4.2 | 4.9 | 5.1 | 4.9 | 4.5 |
| 2 Months | 0.2 | 0.7 | 4.9 | 4.6 | 4.0 |
| Maximum Torque | | | | | |
| (inch - pounds) | | | | | |
| Fresh | 55 | 55 | 55 | 56 | 56 |
| 1 month | 56 | 57 | 60 | 59 | 57 |
| 2 months | 20 | 25 | 56 | 55 | 49 |

TABLE 1-continued

| | Compositions | | | | |
|---|---|---|---|---|---|
| | None | A | B | C | D |
| | Mooney Viscometer at 270° F | | | | |
| Scorch Time (t$_s$) | | | | | |
| (minutes) | | | | | |
| Fresh | 21.9 | 21.6 | 22.4 | 22.8 | 23.7 |
| 1 month | 14.0 | 18.2 | 19.1 | 19.5 | 22.0 |
| 2 months | 40.0 | 18.6 | 16.3 | 17.5 | 20.0 |

The data in Table I indicate that unstabilized N,N-[(thiocarbonyl)thio]dimorpholine is almost completely degraded after 2 months storage at 45° C., as shown by the drop in maximum cure rate, maximum torque and increase in Mooney Scorch. The data also show that N,N'-[(thiocarbonyl)thio]dimorpholine is improved (stabilized against degradation) by the incorporation therein of 4.7 percent by weight of stabilizers A thru D, as shown by the retention of cure rate after storage for 2 months at 45° C. and by the stability of the Mooney Scorch.

EXAMPLE 2

The procedure of Example 1 is again followed except that the stabilizers are (E) 2.0% of diethylene glycol diacrylate, (F) 1.0% of oxydimethylenebisacrylamide, (G) 5.0% of ethylene dimethacrylate and (H) 0.75% of 1,4-butane-di(oxymethyl) acrylamide. In each instance, effective stabilization of the N,N-[(thiocarbonyl)thio]-dimorpholine is accomplished.

EXAMPLE 3

Again, following the procedure of Example 1, except that the stabilizer comprises 2.5% of oxydi(ethylene oxymethyl) acrylamide. Again, satisfactory stabilization is achieved.

EXAMPLE 4

When the stabilizers of Example 1 are replaced by (I) 0.5% of pentaerythritol tetraacrylate, (J) 1.0% of trimethylolpropane triacrylate, (K) 3.5% of acrylamide and (L) 1.5% of methylolacrylamide, effective stabilization of the accelerator is achieved.

EXAMPLE 5

The procedure of Example 1 is again followed except that the stabilizers are 1-methylheptadecylacrylamide and N,N'-p-methoxybenzylidenebisacrylamide at 1.0%. Again, effective stabilization results.

EXAMPLE 6

N,N'-butylidenebisacrylamide and N,N'-(o-phenylenebis) acrylamide are effective stabilizers for N,N-[(thiocarbonyl)thio]dimorpholine when incorporated therein after storage, as a mixture, total concentration 5.0%, used to accelerate the curing of rubber as set forth in Example 1.

EXAMPLE 7

When the procedure of Example 1 is again followed and the stabilizers employed are:
(M) N-t-butylacrylamide (1.0%)
(N) N-isopropylacrylamide (0.50%)
(O) N-t-octylacrylamide (2.0%)
(P) N-(isobutoxymethyl)acrylamide (1.5%)
(Q) Methylenebisacrylamide (0.75%)
(R) Methoxyethylacrylate (1.0%)
(S) Hexamethylenebisacrylamide (5.0%)
effective stabilization of the accelerator is achieved.

I claim:

1. A stabilized accelerator composition for rubber comprising N,N'-[(thiocarbonyl)thio]dimorpholine and an effective stabilizing amount of a compound selected from (a) amides represented by the Formula

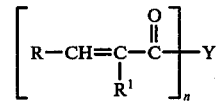

wherein R and R$^1$ are hydrogen or methyl; n is an integer of 1 to 3, inclusive, and Y is selected from —NH$_2$, —NHR$^2$, —N(R$^3$)$_2$, —(NH)$_2$R$^4$, —(NHCH$_2$O)$_2$R$^5$ and

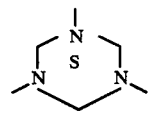

wherein R$^2$ and R$^3$ are, individually, alkyl, alkoxyalkyl or hydroxymethyl; R$^4$ and R$^5$ are, individually, alkylene, arylene or oxydialkylene; and (b) esters represented by the Formula:

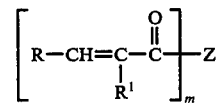

wherein R and R$^1$ are as defined above, and m is an integer from 1 to 4, inclusive, provided that when m is 1, Z is the group: —OR$^6$, wherein R$^6$ is alkyl or alkoxyalkyl; when m is 2, Z is the group: —OR$^7$O—, wherein R$^7$ is alkylene or oxydialkylene; when m is 3, Z is the group:

—OR$^8$O— wherein R$^8$ is alkylene; and when m is 4, Z is the group:

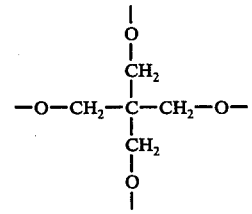

2. The composition of claim 1 wherein the stabilizing compound is oxydimethylenebisacrylamide.

3. The composition of claim 1 wherein the stabilizing compound is 1,3-butyleneglycoldiacrylate.

4. The composition of claim 1 wherein the stablizing compound is pentaerythritol tetraacrylate.

5. The composition of claim 1 wherein the stabilizing compound is triacrylylhexahydro-s-triazine.

* * * * *

UNITED STATES PATENT OFFICE
CERTIFICATE OF CORRECTION

Patent No. 4,116,855    Dated Sept. 26, 1978

Inventor(s) Rudolf Adolf Behrens

It is certified that error appears in the above-identified patent and that said Letters Patent are hereby corrected as shown below:

In the claims:

Claim 1, line 43 should read:

$$-\text{OR}^8\underset{\underset{O}{|}}{}O-$$

Signed and Sealed this

Third Day of July 1979

[SEAL]

Attest:

Attesting Officer

LUTRELLE F. PARKER
Acting Commissioner of Patents and Trademarks